Patented Mar. 29, 1927.

1,622,536

UNITED STATES PATENT OFFICE.

PAUL I. MURRILL, OF PLAINFIELD, NEW JERSEY, ASSIGNOR TO R. T. VANDERBILT CO., INC., OF NEW YORK, N. Y., A CORPORATION OF NEW YORK.

VULCANIZATION PROCESS AND PRODUCT.

No Drawing. Original application filed September 30, 1925, Serial No. 59,573. Divided and this application filed August 28, 1926. Serial No. 132,324.

This invention relates to the vulcanization of rubber and includes the new vulcanization process as well as the new vulcanization products.

According to the present invention, the vulcanization is carried out with the addition to the rubber of sulfur and of organic selenium compounds containing the group —CSS—, these selenium compounds being active both as vulcanizing agents and as accelerators of vulcanization.

The new organic selenium compounds used in the process of the present invention and in making the new vulcanized products of the invention have the following general formula $(-CSS)_4Se$, and they may contain nitrogen, oxygen or carbon joined to the carbon of the above formula. Among the new vulcanizing agents which are particularly valuable for use in carrying out the invention are the selenium salts or compounds of diethyl- and dimethyldithiocarbamic acid of the general formula $(RR'N.CSS)_4Se$, where R and R' represent simple or substituted hydrocarbon radicals which may be the same or different radicals, such as methyl, ethyl, phenyl, benzyl, etc., or where RR'N represents piperidyl, etc. Similiar selenium compounds can be derived from the xanthic acids of the general formula $(RO.CSS)_4Se$ and from dithioacetic, dithiobenzoic, etc., acids, of the general formula $(\equiv C.CSS)Se$.

The new selenium compounds can be produced in accordance with the process more fully described in my companion application Serial No. 59,571, filed September 30, 1925, by the action of a soluble selenite such as sodium selenite upon the sodium salt of the dithioacid, with the addition of a mineral or organic acid such as hydrochloric acid. The selenium diethyl- and dimethyldithiocarbamates may be produced, for example, by the reaction of the sodium dimethyl- or diethyldithiocarbamate (4 mols.) upon sodium selenite (1 mol.) and 6 mols. of hydrochloric acid. The selenium diethyldithiocarbamate is readily soluble in carbon bisulfide and crystallizes therefrom on the addition of benzol. When thus crystallized it forms brilliant orange colored plates melting at about 94–95° C. The technical product has a melting point of about 90–95° C. The corresponding dimethyl compound is a yellowish powder melting at about 163–165° C. and is so sparingly soluble in the usual organic solvents that it is difficultly obtainable in a pure crystalline form.

In using the new compounds in the vulcanization of rubber, they are used as vulcanizing agents and as accelerators of vulcanization with the addition of sulfur. When thus used with sulfur, they may be compounded with the rubber mix in the usual way and used to the extent of a small fraction of 1% e. g., about ⅛ to ¼% of the rubber.

The following specific examples further illustrate the invention, the example giving the results obtained with the use of the new selenium compounds as accelerators in the following mix:—

Pale crepe _____ 100
Whiting _____ 50
Zinc oxide _____ 5
Sulfur _____ 4

The selenium dimethyl or diethyldithiocarbamate was used to the extent of $\tfrac{3}{16}\%$ on the rubber. The compounds were vulcanized at different temperatures and pressures for different periods of time with the results indicated in the following tabulation. In the following table, the first column shows the time of cure in minutes and the steam pressure employed; the second column shows the tensile strength and elongation obtained with compounds containing $\tfrac{3}{16}\%$ on the rubber of selenium diethyldithiocarbamate; and the third column shows the tensile strength and elongation obtained with $\tfrac{3}{16}\%$ on the rubber of selenium dimethyldithiocarbamate.

| Time and temperature of cure | Tensile and stretch | Tensile and stretch |
|---|---|---|
| 30 min. at 2.5 lbs | 2940—715 | 3440—690 |
| 45 min. at 2.5 lbs | 3320—720 | 3340—690 |
| 60 min. at 2.5 lbs | 3460—720 | 3700—685 |
| 15 min. at 10 lbs | 2880—685 | 3320—665 |
| 30 min. at 10 lbs | 3610—700 | 2720—660 |
| 45 min. at 10 lbs | 3680—690 | 3520—665 |
| 10 min. at 20 lbs | 2990—720 | 3120—670 |
| 15 min. at 20 lbs | 3190—710 | 3240—635 |
| 30 min. at 20 lbs | 3360—730 | 3120—680 |
| 5 min. at 40 lbs | 3040—710 | 3260—710 |
| 15 min. at 40 lbs | 3200—700 | 2830—700 |
| 30 min. at 40 lbs | 2910—670 | 2690—670 |

It will be seen that the vulcanization can be effected at ordinary temperatures and that at higher temperatures the vulcanization is completed in a short period of time and that the compounds on further curing are only slowly reduced in tensile strength and elongation.

The following example illustrates the use of the new organic selenium compounds as accelerators in a pure gum stock. The compound used was as follows:

| | |
|---|---|
| Pale crepe | 100 |
| Zinc oxide | 5 |
| Sulfur | 4 |
| Accelerator | 0.25 |

Using selenium dimethyldithiocarbamate as the accelerator, the following results were obtained:

| Time and temperature of cure | Tensile and stretch |
|---|---|
| 30 min. at 105° C. (2.5 lbs.) | 4,060—865 |
| 45 min. at 105° C. (2.5 lbs.) | 4,800—790 |
| 30 min. at 115° C. (10 lbs.) | 5,050—810 |
| 45 min. at 115° C. (10 lbs.) | 5,300—800 |
| 15 min. at 125° C. (20 lbs.) | 3,700—730 |
| 30 min. at 125° C. (20 lbs.) | 4,700—720 |
| 5 min. at 141° C. (40 lbs.) | 3,810—825 |
| 30 min. at 141° C. (40 lbs.) | 4,400—780 |

From these examples it will be seen that the new organic selenium compounds used in the process of the present invention are rapid in their action, causing cures at low temperature and in a short time, and that the stocks are not injured by longer exposure to heat, i. e., do not overcure readily.

The new vulcanized products have improved properties and are characterized by containing selenium as well as sulfur therein, together with products of reaction of the organic selenium compounds.

This application is a division of my prior application Serial Number 59,573, filed September 30, 1925.

I claim:

1. The method of vulcanizing rubber which comprises subjecting the rubber to vulcanization with the addition thereto of an organic selenium compound containing the following group:— —CSS— as an accelerator together with sulfur.

2. The method of vulcanizing rubber which comprises subjecting the rubber to vulcanization with the addition thereto of an organic selenium compound of the following general composition:—$Se(SSC-)_4$ as an accelerator together with sulfur.

3. The method of vulcanizing rubber which comprises subjecting the rubber to vulcanization with the addition thereto of an organic selenium compound of the following general formula:—$(RR'NCSS)_4Se$, where R and R' are hydrocarbon radicals, as an accelerator together with sulfur.

4. The method of vulcanizing rubber which comprises subjecting the rubber to vulcanization in the presence of selenium dialkyldithiocarbamate as an accelerator together with sulfur.

5. The method of vulcanizing rubber which comprises subjecting the rubber to vulcanization in the presence of selenium diethyldithiocarbamate as an accelerator together with sulfur.

6. New vulcanized rubber products vulcanized with the addition thereto before vulcanization of sulfur and an organic selenium compound containing the following group:— —CSS—.

7. New vulcanized rubber products vulcanized with the addition thereto before vulcanization of sulfur and an organic selenium compound of the following general composition:— $Se(SSC-)_4$.

8. New vulcanized rubber products vulcanized with the addition thereto before vulcanization of sulfur and an organic selenium compound of the following general formula:— $(RR'NCSS)_4Se$, where R and R' are hydrocarbon radicals.

9. New vulcanized rubber products vulcanized in the presence of sulfur and selenium dialkyldithiocarbamate.

10. New vulcanized rubber products vulcanized in the presence of sulfur and selenium diethyldithiocarbamate.

In testimony whereof I affix my signature.

PAUL I. MURRILL.